United States Patent
Jeon et al.

(10) Patent No.: US 12,503,596 B2
(45) Date of Patent: Dec. 23, 2025

(54) LOW-DIELECTRIC-CONSTANT POLYIMIDE COMPOSITE POWDER, AND METHOD FOR PRODUCING SAME

(71) Applicant: PI Advanced Materials Co., Ltd., Chungcheongbuk-do (KR)

(72) Inventors: Jin-Seok Jeon, Chungcheongbuk-do (KR); Min-Sang Cho, Chungcheongbuk-do (KR); Kil-Nam Lee, Chungcheongbuk-do (KR)

(73) Assignee: PI Advanced Materials Co., Ltd.

( * ) Notice: Subject to any disclaimer, the term of this patent is extended or adjusted under 35 U.S.C. 154(b) by 791 days.

(21) Appl. No.: 17/778,479

(22) PCT Filed: Nov. 20, 2020

(86) PCT No.: PCT/KR2020/016495
§ 371 (c)(1),
(2) Date: May 20, 2022

(87) PCT Pub. No.: WO2021/101324
PCT Pub. Date: May 27, 2021

(65) Prior Publication Data
US 2023/0002613 A1    Jan. 5, 2023

(30) Foreign Application Priority Data
Nov. 22, 2019  (KR) .................. 10-2019-0151113

(51) Int. Cl.
*C08L 79/08*    (2006.01)

(52) U.S. Cl.
CPC .................. *C08L 79/08* (2013.01)

(58) Field of Classification Search
CPC ....... C08L 79/08; C08L 27/12; C08G 73/105; C08G 73/1071; C08J 3/12; C08J 9/232; C08J 2379/08
See application file for complete search history.

(56) References Cited

FOREIGN PATENT DOCUMENTS

| | | | | |
|---|---|---|---|---|
| JP | 2001-294815 | A | 10/2001 | |
| JP | 2015034289 | A * | 2/2015 | ............. C08G 73/10 |
| KR | 100495096 | B1 * | 6/2005 | |
| KR | 10-1503332 | B | 3/2015 | |
| KR | 1503332 | B1 * | 3/2015 | ............... C08J 5/18 |
| KR | 10-1548877 | B | 8/2015 | |
| KR | 10-2016-0038588 | B | 4/2016 | |
| KR | 20160038588 | A * | 4/2016 | |
| KR | 10-1714980 | B | 3/2017 | |
| KR | 10-2019-0009768 | A | 1/2019 | |
| KR | 10-2019-0118559 | A | 10/2019 | |
| KR | 20190118559 | A * | 10/2019 | |

OTHER PUBLICATIONS

International Search Report and Written Opinion from related PCT Application No. PCT/KR2020/016495, dated Dec. 1, 2020, 9 pages.

* cited by examiner

*Primary Examiner* — Kumar R Bhushan
(74) *Attorney, Agent, or Firm* — Brooks, Cameron & Huebsch, PLLC

(57) ABSTRACT

The present invention provides: a polyimide composite powder which includes 1-30 wt % of a fluorine-based resin filler, and has excellent low dielectric properties; and a production method using water as a dispersion medium. Also provided are a molded body including the polyimide composite powder, and a method for producing same.

6 Claims, No Drawings

LOW-DIELECTRIC-CONSTANT POLYIMIDE COMPOSITE POWDER, AND METHOD FOR PRODUCING SAME

TECHNICAL FIELD

The present disclosure relates to a low-dielectric polyimide composite powder including a fluorine-based filler, a molded body, and a manufacturing method therefor.

BACKGROUND ART

Polyimide (PI), which is a thermally stable polymeric material with a robust aromatic backbone, exhibit excellent levels of mechanical strength, chemical resistance, weather resistance, and heat resistance on the basis of the chemical stability of the imide rings.

In addition, having excellent electrical properties such as insulation properties, a low dielectric dissipation factor, and so on, polyimides enjoy applications as high-performance polymers in diverse fields including microelectronics and optical fields.

As for the microelectronics field, for example, flexible thin circuit boards are being actively developed to allow for a high level of integration in response to the miniaturization and weight reduction of electronic products, with the resultant tendency of utilizing polyimide as a protective film of thin circuit boards due to the excellent heat resistance, low-temperature tolerance, insulation, and flexibility thereof.

With the installation of various functions therein, electronic devices have recently been required to have fast calculation and communication speeds. To meet this requirement, development has been made of thin-film circuit boards that enable high-speed communication at a high frequency.

Realization of high-speed communication at high frequency requires an insulator with a high impedance that allows for the maintenance of electrical insulation even at high frequencies. With the relationship of inverse proportion of an impedance to the frequency and dielectric constant (Dk) formed in an insulator, as low a dielectric constant as possible is advantageous for maintaining insulation at high frequencies.

In the case of general polyimides, however, their dielectric properties fall short of a level excellent enough to maintain sufficient insulation in high-frequency communication.

In addition, it has been reported that insulators with lower dielectric properties are more likely to reduce undesired stray capacitance and noise generation in a thin-film circuit board, thereby significantly removing causes of communication latency.

Accordingly, a polyimide with low-dielectric properties is now accepted as an important factor above all else in the performance of a thin-film circuit board.

During high-frequency communication, dielectric dissipation through polyimide inevitably occurs. Since dielectric dissipation factor (Df), which is a degree of electrical energy loss in a thin-film circuit board, closely correlates with the signal propagation delay that determines communication speed, maintenance of the dielectric dissipation factor at as low a level as possible is recognized as an important factor for the performance of a thin-film circuit board.

Currently used for polyimide synthesis is a general two-step method in which acid dianhydride monomers are reacted with diamine monomers to synthesize the precursor polyamic acid (PAA), followed by imidiziation of the polyamic acid.

In this method, the preparation of polyamic acid is achieved through the ring opening polyaddition of acid dianhydride monomers with diamine monomers in a reaction solvent. The solvents mainly used for this reaction are accounted for by polar organic solvents such as N,N-dimethylacetamide, N,N-dimethylformamide, N-methylpyrrolidone, meta-cresol, etc.

In the imidization step, thermal imidization, chemical imidization, or a combination thereof is applied to the polyamic acid prepared in the polyamic acid synthesis step.

Chemical imidization is a process in which a solution of the precursor polyamic acid is heated at 160° C. or higher in the presence of a dehydrating agent represented by an acid anhydride such as acetic anhydride, etc. and an imidizing catalyst represented by tertiary amines.

Thermal imidization is accounted for by a process in which a solution of the precursor polyamic acid is applied to a substrate and the solvent is evaporated, followed by heating at 250 to 350° C. in the absence of a chemical dehydrating agent and a catalyst.

As stated above, the conventional polyimide synthesis methods take the way of passing via polyamic acid. By contrast, a method for directly synthesizing a polyimide from monomers was also developed. In relation thereto, reference may be made to Advances in Polymer Science, 140: 1-22, 1999, which discloses the synthesis of polyimide by preparing salts of acid dianhydride monomers and diamine monomers and heating the salts.

However, these methods adopt many synthesis steps which are somewhat cumbersome and give rise to an increase in production cost in addition to suffering from the disadvantage of generating waste heat due to a heating process at high temperatures.

Furthermore, the organic solvents used might produce environmental pollution.

RELATED ART DOCUMENT

Patent Literature (Patent literature 1) 1. Korean Patent No. 10-1548877
(Patent literature 2) 2. Korean Patent No. 10-1714980

DISCLOSURE

Technical Problem

In order to solve the problems encountered in the related art, the present disclosure aims to provide a low-dielectric polyimide composite powder including a fluorine-based resin filler, a molded body, and a method for manufacturing same. In the present disclosure, water is used as a dispersion medium so as to solve the problems with the use of organic solvents, such as environmental pollution, increased production cost, residual solvents, and so on. In addition, the present disclosure takes greatly fewer synthesis steps, compared to conventional polyimide manufacturing methods and as such, can afford polyimides of high molecular weights at high yield. Moreover, the polyimide composite powder obtained is prepared into a molded body which exhibits improved low-dielectric properties while minimizing degradation of mechanical properties, compared to pre-existing products.

Technical Solution

According to an aspect thereof, the present disclosure provides a polyimide composite powder comprising a fluorine-based resin filler in an amount of 1% by weight to 30% by weight.

The fluorine-based resin filler may be formed of a fluorine-based resin be at least one selected from the group consisting of polytetrafluoroethylene (PTFE), a tetrafluoroethylene-perfluoroalkylvinylether copolymer (PFA), a tetrafluoroethylene-hexafluoropropylene copolymer (FEP), an ethylene-tetrafluoroethylene copolymer resin (ETFE), a tetrafluoroethylene-chlorotrifluoroethylene copolymer (TFE/CTFE), and an ethylene-chlorotrifluoroethylene resin (ECTFE).

According to another aspect thereof, the present disclosure provides a molded body comprising the polyimide composite powder.

The molded body may have a dielectric constant of 3.2 to 3.6 and a tensile strength of 50 to 67 MPa.

According to a further aspect thereof, the present disclosure provides a method for manufacturing a polyimide composite powder, the method comprising the steps of:
  (a) stirring an acid dianhydride monomer and a diamine monomer in water in a temperature range of 25 to 95° C. to form a mixture of monomer salts;
  (b) adding 1% by weight to 30% by weight of a fluorine-based resin filler to the mixture while stirring; and
  (c) stirring the mixture in a reaction condition having a temperature of 150° C. or higher and a pressure of 10 bar or higher to afford the polyimide composite powder.

The method for manufacturing a polyimide composite powder may further comprise the steps of (d) washing and filtering the polyimide composite powder; and (e) drying the filtrate.

In addition, the filtering step may be conducted in a vacuum filtration process and the drying step may be conducted at 50° C. or higher in a vacuum.

According to a still further aspect thereof, the present disclosure provides a method for manufacturing a molded body, the method comprising the steps of:
  molding the polyimide composite powder, manufactured by the method for manufacturing a polyimide composite powder, to a body; and
  sintering the molded body.

According to these aspects, the above-mentioned problems with the related art can be solved and, in this regard, concrete embodiments are substantially provided.

Advantageous Effects

As stated in the foregoing, the problems, such as environmental pollution, an increase in production cost, residual solvent, etc., can be solved by the low-dielectric polyimide composite powder, synthesized using water as a dispersion medium, including a fluorine-based resin filler, and the manufacturing method therefor according to the present disclosure. In addition, the polyimide composite powder is prepared into a molded body which exhibits lower dielectric constants than preexisting products, finding advantageous applications in a variety of fields requiring low dielectric properties.

BEST MODE FOR CARRYING OUT THE INVENTION

Below, a detailed description will be given of the present disclosure in the order of "a polyimide composite powder", "a molded body comprising the polyimide composite powder", "a method for manufacturing a polyimide composite powder", and "a method for manufacturing a molded body containing a polyimide composite powder".

Terms and words used in the present specification and claims should not be limited to general or dictionary meanings, but are to be construed as meaning and concepts meeting the technical ideas of the present disclosure based on a principle that the present inventors may appropriately define the concepts of terms in order to describe their inventions in the best mode.

Therefore, the configurations of embodiments described herein are only one of the most preferred embodiments of the present disclosure and do not represent all the technical spirits of the present disclosure. Thus, it should be understood that there may be various equivalents and modification examples that can replace them at the time of filing the present application.

Singular forms as used herein include plural forms unless the context clearly indicates otherwise. It should be understood that the terms "comprise", "includes", or "have", etc., as used herein specify the presence of implemented features, numerals, steps, components, or a combination thereof, but do not preclude the presence or addition of one or more other features, numerals, steps, components, or a combination thereof.

It should be understood that when an amount, concentration, or other value or parameter as used herein is given as an enumeration of a range, a preferable range, or preferable upper and lower values, all ranges formed with any upper limit or preferable values of any one pair and any lower limit or preferable values of any one pair are specifically disclosed, regardless of whether the range is disclosed separately.

When a range of numerical values is referred to herein, the range is intended to include endpoints thereof and all integers and fractions within that range, unless stated otherwise. It is intended that the scope of the present disclosure is not limited to specific values recited when the range is defined.

As used herein, the term "dianhydride" is intended to encompass precursors or derivatives thereof which may not fall within the scope of dianhydrides from a technical point of view, but nevertheless will react with diamine to form polyamic acids which can be then converted into polyimides.

As used herein, the term "diamine" is intended to encompass precursors or derivatives thereof which may not fall within the scope of diamines from a technical point of view, but nevertheless will react with dianhydride to form polyamic acids which can be then converted into polyimides.

The polyimide composite powder according to the present disclosure contains a fluorine-based resin filler in an amount of 1% by weight to 30% by weight, based on 100% by weight thereof. The polyimide composite powder is superb in terms of dispersibility in various dispersion media and in water, which is the dispersion medium in the reaction.

The polyimide composite powder synthesized may have an average diameter of 500 µm or less and preferably 100 µm or less.

The polyimide in the polyimide composite powder may be obtained by an imidization reaction between:

The polyimide in the polyimide composite powder may be obtained by an imidization reaction between:
  at least one acid dianhydride monomer selected from the group consisting of pyromellitic dianhydride (PMDA), oxydiphthalic dianhydride (ODPA), 3,3',4,4'-biphenyltetracarboxylic dianhydride (s-BPDA), 2,3,3',4'-biphenyltetracarboxylic dianhydride (a-BPDA), diphenylsulfone-3,4,3',4'-tetracarboxylic dianhydride (DSDA), bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride (BTDA), bis(3,4-dicarboxyphenyl)methane dianhydride, 2,2-bis(3,4-dicarboxyphenyl)propane dianhydride, p-phenylene bis(trimellitic monoester acid anhydride), p-biphenylene bis(trimellitic monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxy phenoxy)phenyl]propane dianhydride (BPADA), 2,3,6,7-naphthalenetetracarboxylic acid dianhydride, 1,4,5,8-naphthalenetetracarboxylic dianhydride, and 4,4'-(2,2-hexafluoroisopropylidene)diphthalic acid dianhydride; and at least one diamine monomer selected from the group consisting of para-phenylenediamine(PPD), meta-phenylenediamine, 3,3'-dimethylbenzidine, 2,2'-dimethylbenzidine, 2,4-diaminotoluene, 2,6-diaminotoluene, 3,5-diaminobenzoic acid(DABA), 4,4'-diaminodiphenylether(ODA), 3,4'-diaminodiphenylether, 4,4'-diaminodiphenylmethane(methylenediamine), 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dimethoxybenzidine, 2,2'-dimethoxybenzidine, 3,3'-diaminodiphenylether, 3,4'-diaminodiphenylether, 4,4'-diaminodiphenylether, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenylsulfoxide, 3,4'-diaminodiphenylsulfoxide, 4,4'-diaminodiphenylsulfoxide, 1,3-bis(3-aminophenyl) benzene, 1,3-bis(4-aminophenyl)benzene, 1,4-bis(3-aminophenyl)benzene, 1,4-bis(4-amino phenyl) benzene, 1,3-bis(4-aminophenoxy)benzene(TPE-R), 1,4-bis(3-aminophenoxy)benzene(TPE-Q) 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-(3-aminophenyl)isopropyl]benzene, 1,4-bis[2-(4-aminophenyl)isopropyl] benzene, 3,3'-bis(3-aminophenoxy)biphenyl, 3,3'-bis(4-aminophenoxy)biphenyl, 4,4'-bis(3-aminophenoxy) biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, bis[3-(3-aminophenoxy)phenyl]ketone, bis[3-(4-aminophenoxy)phenyl]ketone, bis[4-(3-aminophenoxy)phenyl]ketone, bis[4-(4-amino phenoxy)phenyl]ketone, bis[3-(3-aminophenoxy)phenyl]sulfide, bis[3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane(BAPP), 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, and 2,2-bis[4-(4-aminophenoxy)phenyl]-1,1,1,3,3,3-hexafluoropropane, but with no limitations thereto. So long as it forms a monomer salt in water serving as a dispersion medium, any of acid dianhydride and diamine monomers known in the art can be used in the present disclosure.

In some particular embodiments, the acid dianhydride monomer may include pyromellitic dianhydride, 3,3',4,4'-biphenyltetracarboxylic dianhydride, and 3,3',4,4'-benzophenonetetracarboxylic dianhydride.

In some particular embodiment, the diamine monomer may include para-phenylenediamine and 4,4'-diaminodiphenylether.

The fluorine-based resin in the fluorine-based resin filler may be at least one selected from the group consisting of polytetrafluoroethylene (PTFE), a tetrafluoroethylene-perfluoroalkylvinylether copolymer (PFA), a tetrafluoroethylene-hexafluoropropylene copolymer (FEP), an ethylene-tetrafluoroethylene copolymer resin (ETFE), a tetrafluoroethylene-chlorotrifluoroethylene copolymer (TFE/CTFE), and an ethylene-chlorotrifluoroethylene resin (ECTFE), with no limitations thereto.

In some particular embodiments, polytetrafluoroethylene or a tetrafluoroethylene-perfluoroalkylvinylether copolymer may be employed due to the excellent dispersability and low hydroscopicity The fluorine-based resin filler may have an average diameter of 1 μm or less, particularly an average diameter of 0.5 μm or less, and more particularly an average diameter of 0.1-0.3 μm.

The polyimide composite powder may be molded into a body in various ways.

The molded body may have a dielectric constant of 3.2 to 3.6 and a tensile strength of 50 to 67 MPa.

The method for manufacturing a polyimide composite powder according to the present disclosure may comprise the steps of:

(a) stirring an acid dianhydride monomer and a diamine monomer in water in a temperature range of 25 to 95° C. to form a mixture of monomer salts;
(b) adding 1% by weight to 30% by weight of a fluorine-based resin filler to the mixture while stirring; and
(c) stirring the mixture in a reaction condition of heating at a temperature of 150° C. or higher and at a pressure of 10 bar or higher to afford the polyimide composite powder.

In step (a), an organic solvent may be used. The water may be selected from among distilled water, deionized water, and tap water. In addition, the organic solvent may be a single solvent selected from the group consisting of N-methyl-2-pyrrolidone, N,N-dimethyl acetamide, N,N-dimethyl formamide, N-vinylpyrrolidone, N-methyl caprolactam, dimethylsulfoxide, tetramethyl urea, pyridine, dimethyl sulfone, hexamethyl sulfoxide, meta-cresol, gamma-butyrolactone, ethyl cellosolve, ethylcarbitol, butylcarbitol, ethylcarbitol acetate, butylcarbitol acetate, ethylene glycol ethyl lactate, butyl lactate, cyclohexanone, cyclopentanone, hexane (normal hexane, iso-hexane, cyclohexane), heptane, benzene, toluene, xylene, methanol, ethanol, propanol (normal propanol, iso-propanol), butanol (normal-, iso-, tertiary-), cyclohexanol, octanol, benzyl alcohol, acetone, methylethylketone, methylbutylketone, methyl acetate, ethyl acetate, isopropyl ether, tetrahydrofuran, chloroform, dioxane, diethylformamide, sulfolane, formic acid, acetic acid, propionic acid, acetonitrile, and tetralin, or a mixed solvent thereof.

In step (a), the diamine monomer may be used at a molar ratio of 0.5 to 2 equivalents, relative to the acid dianhydride monomer, and particularly at a molar ratio of 0.8 to 1.5 equivalents. When the molar ratio is below 0.5 equivalents or over 2 equivalents, the resulting polyimide has a very small molecular weight and thus exhibits degraded physical and chemical properties.

Step (a) may be conducted in various manners. By way of example, the monomers are each dispersed in a solvent (e.g., water) and then fed into a rection vessel. In one alternative, a solvent is first introduced into a reaction vessel before each monomer is added thereto. In another alternative, each monomer is put into a reaction vessel, followed by the addition of a solvent. A combination of these alternatives may be taken.

When the temperature in step (a) is less than 25° C., the reaction is not smoothly conducted. A temperature exceeding 95° C. may require an additional heat supply or a condenser, or an additional process.

In addition, step (a) may be conducted for 1 hour to 5 days and particularly for 3 hours to 2 days. When step (a) is conducted for less than 1 hour, the reaction may not proceed sufficiently. A process duration exceeding 5 days may excessively increase the cost.

Step (c) may be conducted in a temperature range of 150 to 450° C. and particularly in a temperature range of 180 to 350° C. When step (c) is conducted at less than 150° C., the imidization may not proceed. At a temperature higher than 450° C., the monomers or the polymer itself may undergo thermal degradation.

Step (c) may be conducted for 10 minutes to 3 days, particularly for 30 minutes to 2 days, and more particularly for 1 hour to 1 day. When step (c) is conducted for less than 10 minutes, the imidization may not proceed. When step (c) is conducted for longer than 3 days, the polymer itself may undergo thermal degradation.

In step (c), the heating may be performed using a method selected from the group consisting of thermal treatment, hot air treatment, corona treatment, high-frequency treatment, ultraviolet treatment, infrared treatment, laser treatment, and a combination thereof.

In addition, step (c) may be conducted at a pressure of 10 bar to 1000 bar. A reaction pressure exceeding 1000 bar may cause a damage to the reaction vessel Step (c) may be conducted in an air condition or an inactive gas atmosphere.

The pressure condition may be attained in a mode selected from the group consisting of the formation of vapor pressure in the pressure vessel, the injection of an inactive gas into the pressure vessel, the compression of the pressure vessel, and a combination thereof. The inactive gas may be selected from the group consisting of nitrogen, argon, helium, neon, crypton, xenon, and a combination thereof.

The method for manufacturing a polyimide composite powder may further comprise the steps of (d) washing and filtering the polyimide composite powder; and (e) drying the filtrate.

The filtration may be performed using a process selected from the group consisting of gravity filtration, decompression filtration, vacuum filtration, compression filtration, press filtration, centrifugal filtration, microfiltration, ultrafiltration, reverse osmosis, or a combination thereof, with preference for decompression filtration.

The drying may be performed using a process selected from the group consisting of natural drying, compression drying, hot air drying, spray drying, coating drying, vacuum drying, freeze drying, spray freeze drying, electromagnetic wave drying, flash drying, and a combination thereof.

Particularly preferred is drying at 50° C. in a vacuum.

The polyimide composite powder, manufactured by the method for manufacturing a polyimide composite powder, may be prepared into a molded body through molding and sintering steps.

In this molding step, compression molding, injection molding, rotary molding, thermal molding, and slush molding may be adopted.

The molded body thus obtained can find applications in various forms such as films, adhesives, tapes, fibers, multilayer films, etc. in a broad spectrum of industrial fields including space, aviation, electrics/electrons, semiconductors, displays, automobile, precision instrument, packaging, medical materials, separators, fuel cells, and secondary batteries In addition, the molded body may be applied to various fields demanding excellent low dielectric properties. For instance, it may be applied to an electronic part comprising an electrical signal transfer circuit. The electrical signal transfer circuit may transfer signals at a frequency of at least 2 GHz, particularly at least at a frequency of at least GHz, and more particularly at a frequency of at least 10 GHz.

The electronic part may include, for example, a communication circuit for mobile terminals, computers, and aerospace flights, but is not limited thereto.

Mode for Carrying Out the Invention

Below, a better understanding of the present disclosure may be obtained via the following examples which are set forth to illustrate, but are not to be construed as limiting, the present disclosure.

Example 1

Manufacture of Polyimide Composite Powder

In a 5-neck beaker-type reaction bath, 23.46 g of PMDA was added to distilled water weighing 255 g and stirred with the aid of a high-speed stirrer (70° C., 1 hour) to convert PDMA into the tetracarboxylic acid form. Then, 21.54 g of ODA was added to synthesize monomer salts (70° C., 2 hours). In this regard, the monomer salts had a concentration of 15% by weight, with a content of ~15% by weight. The mixture of monomer salts thus obtained was added with 1% by weight of fluorine-based resin (PTFE), followed by stirring same to give a dispersion. The mixture of monomer salts and fluorine-based resin(PTFE) was stirred at 190° C. for ~6 hours in an autoclave (190° C. under a pressure of 12-15 bar). The suspension of polyimide composite powder was filtered in a vacuum while being washed with distilled water.

The undried polyimide composite powder obtained through vacuum filtration was dried at 60° C. for 24 hours to give polyimide composite powder.

Manufacture of Molded Body of Polyimide Composite Powder

The polyimide composite powder was weighed, put into a mold for assaying physical properties, and molded by a compression using a hot press (ca. 100,000 psi). Thereafter, the molded body of polyimide composite powder was sintered in a nitrogen atmosphere in a high-temperature oven (100° C. 1 hour, 250° C. 1 hour, 450° C. 3 hours).

Examples 2 to 4 and Comparative Examples 1 to 3

Molded bodies were manufactured in the same manner as in Example 1 with the exception that the contents of fluorine-based resin (PTFE) fillers were changed as indicated in Table 1, below. The molded bodies manufactured in Examples 1 to 4 and Comparative Examples 1 to 3 were measured for dielectric constant and tensile strength in the following manners.

1) Dielectric Constant

The samples were measured for dielectric constant at 10 GHz using SPDR from Keysight.

2) Tensile Strength

The samples were measured for tensile strength according to ASTM D1708 using a universal testing machine (Model Instron 5564, Instron).

TABLE 1

| | PTFE filler content (wt %) | Dielectric constant | Tensile strength (MPa) |
|---|---|---|---|
| Example 1 | 1.0 | 3.6 | 67 |
| Example 2 | 10.0 | 3.5 | 59 |
| Example 3 | 20.0 | 3.3 | 54 |
| Example 4 | 30.0 | 3.2 | 51 |
| C. Example 1 | 0 | 3.7 | 68 |
| C. Example 2 | 0.1 | 3.7 | 67 |
| C. Example 3 | 50.0 | 3.2 | 41 |

As shown in Table 1, the molded bodies manufactured according to the Examples were observed to have a dielectric constant of 3.2 to 3.6 and a tensile strength of 50 to 67 MPa.

That is, the Comparative Examples were measured to fail to meet any of the following characteristics:
Dielectric constant of 3.2 to 3.6
Tensile strength of 50 to 67 MPa Employing smaller amounts of fluorine-based resin fillers compared to the Examples, Comparative Examples 1 and 2 were measured to have high dielectric constants.

Comparative Example 3 employed fluorine-based resin fillers at a higher content and thus exhibited a lower dielectric constant, but greatly poor in tensile strength, compared to the Examples. Hence, it was not suitable for use in practical products.

Taken together, the measurement data suggests that given fluorine-based resin filler content range set forth in the present disclosure, the molded body is preferably provided with suitable levels of dielectric constant and tensile strength.

Although the present disclosure has been described with reference to the embodiments thereof, it should be understood by those skilled in the art that various applications and modifications may be made without departing from the scope of the present disclosure.

INDUSTRIAL APPLICABILITY

The present disclosure can solve the problems, such as environmental pollution, an increase in production cost, residual solvent, etc., by providing the low-dielectric polyimide composite powder, synthesized using water as a dispersion medium, including a fluorine-based resin filler, and the manufacturing method therefor. In addition, the polyimide composite powder is prepared into a molded body which exhibits lower dielectric constants than preexisting products, finding advantageous applications in a variety of fields requiring low dielectric properties.

The invention claimed is:

1. A polyimide composite powder, comprising a filler consisting of a fluorine-based resin filler, wherein the fluorine-based resin filler is present in an amount of 1% by weight to 30% by weight,
    wherein the polyimide composite powder comprises a polyimide including an acid dianhydride monomer and a diamine monomer as polymerization units,
    wherein the acid dianhydride monomer comprises pyromellitic dianhydride (PMDA),
    wherein the diamine monomer comprises 4,4'-diaminodiphenyl ether (ODA),
    wherein the fluorine-based resin filler is formed of fluorine-based resin, and
    wherein the fluorine-based resin comprises polytetrafluoroethylene (PTFE).

2. The polyimide composite powder of claim 1, wherein the polyimide further comprises:
    at least one acid dianhydride monomer selected from the group consisting of oxydiphthalic dianhydride (ODPA), 3,3',4,4'-biphenyltetracarboxylic dianhydride (s-BPDA), 2,3,3',4'-biphenyltetracarboxylic dianhydride (a-BPDA), diphenylsulfone-3,4,3',4'-tetracarboxylic dianhydride (DSDA), bis(3,4-dicarboxyphenyl) sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride (BTDA), bis(3,4-dicarboxyphenyl)methane dianhydride, 2,2-bis(3,4-dicarboxyphenyl)propane dianhydride, p-phenylene bis(trimellitic monoester acid anhydride), p-biphenylene bis(trimellitic monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4- dicarboxyphenoxy)biphenyl dianhydride, 2,2-bis[(3,4-dicarboxy phenoxy)phenyl]propane dianhydride (BPADA), 2,3,6,7-naphthalenetetracarboxylic acid dianhydride, 1,4,5,8-naphthalenetetracarboxylic dianhydride, and 4,4'-(2,2-hexafluoroisopropylidene)diphthalic acid dianhydride; and at least one diamine monomer selected from the group consisting of para-phenylenediamine, meta-phenylenediamine, 3,3'-dimethylbenzidine, 2,2'-dimethylbenzidine, 2,4-diaminotoluene, 2,6-diaminotoluene, 3,5-diaminobenzoic acid(DABA), 3,4'-diaminodiphenylether, 4,4'-diaminodiphenylmethane (methylenediamine), 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dimethoxybenzidine, 2,2'-dimethoxybenzidine, 3,3'-diaminodiphenylether, 3,4'-diaminodiphenylether, 4,4'-diaminodiphenylether, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-aminophenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenylsulfoxide, 3,4'-diaminodiphenylsulfoxide, 4,4'-diaminodiphenylsulfoxide, 1,3-bis(3-aminophenyl)benzene, 1,3-bis(4-aminophenyl)benzene, 1,4-bis(3-aminophenyl)benzene, 1,4-bis(4-amino phenyl)benzene, 1,3-bis(4-aminophenoxy)benzene(TPE-R), 1,4-bis(3-aminophenoxy)benzene(TPE-Q) 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-(3-aminophenyl)isopropyl]benzene, 1,4-bis[2-(4-aminophenyl)isopropyl]benzene, 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, bis[3-(3-aminophenoxy)phenyl]ketone, bis[3-(4-aminophenoxy)phenyl]ketone, bis[4-(3-aminophenoxy)phenyl]ketone, bis[4-(4-amino phenoxy)phenyl]ketone, bis[3-(3-aminophenoxy)phenyl]sulfide, bis[3-(4-aminophenoxy)phenyl]sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane (BAPP), 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, and 2,2-bis[4-(4-aminophenoxy)phenyl]-1,1,1,3,3,3-hexafluoropropane.

3. The polyimide composite powder of claim 1, wherein the fluorine-based resin further comprises at least one selected from the group consisting of a tetrafluoroethylene-perfluoroalkylvinylether copolymer (PFA), a tetrafluoroethylene-hexafluoropropylene copolymer (FEP), an ethylene-tetrafluoroethylene copolymer resin (ETFE), a tetrafluoroethylene-chlorotrifluoroethylene copolymer (TFE/CTFE), and an ethylene-chlorotrifluoroethylene resin (ECTFE).

4. A molded body, comprising the polyimide composite powder of any one of claim 1.

5. The molded body of claim 4, having a dielectric constant of 3.2 to 3.6.

6. The molded body of claim 4, having a tensile strength of 50 to 67 MPa.

* * * * *